US009630510B2

(12) United States Patent
Sukumaran et al.

(10) Patent No.: US 9,630,510 B2
(45) Date of Patent: Apr. 25, 2017

(54) SYSTEM, METHOD, AND COMPUTER PROGRAM FOR AN INTEGRATED HUMAN-MACHINE INTERFACE (HMI) OF AN ENGINE-GENERATOR

(71) Applicant: General Electric Company, Schenectady, NY (US)

(72) Inventors: Suseel Sukumaran, Bangalore (IN); Anirban Roy, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/483,180

(22) Filed: Sep. 11, 2014

(65) Prior Publication Data

US 2014/0379193 A1 Dec. 25, 2014

Related U.S. Application Data

(62) Division of application No. 13/664,566, filed on Oct. 31, 2012, now Pat. No. 8,880,249.

(Continued)

(51) Int. Cl.
*B60L 11/02* (2006.01)
*G06F 9/445* (2006.01)
(Continued)

(52) U.S. Cl.
CPC .......... *B60L 11/02* (2013.01); *G05B 19/0426* (2013.01); *G06F 8/60* (2013.01);
(Continued)

(58) Field of Classification Search
CPC ....... B60L 11/02; G06F 8/60; G05B 19/0426; G05B 2219/25081; G05B 2219/25059;
(Continued)

(56) References Cited

U.S. PATENT DOCUMENTS 5,754,033 A * 5/1998 Thomson .................. H02J 3/38
  307/57
6,172,428 B1 * 1/2001 Jordan ...................... H02P 9/04
  290/40 C (Continued)

FOREIGN PATENT DOCUMENTS

CN 102261285 A 11/2011
DE 10250250 A1 5/2004
(Continued)

OTHER PUBLICATIONS

Search Report and Written Opinion from corresponding PCT Application No. PCT/US2012/069041 dated Apr. 16, 2013.

(Continued)

*Primary Examiner* — Rodney Butler
*Assistant Examiner* — Frederick Brushaber
(74) *Attorney, Agent, or Firm* — John A. Kramer; Global Patent Operation

(57) ABSTRACT

In one embodiment, an engine management system (EMS) can use a human machine interface (HMI) to modify operating parameters of a set of engine generators controlled by an engine control unit (ECU). The HMI can permit authorized users to adjust a plurality of operating parameters of the engine generators in accordance with an authorization level of the authorized users. The ECU can be a standalone system operable independent of the EMS. A communication network (e.g., ARCnet) can link the EMS to the ECU, wherein the changes of the operating parameters input via the HMI are maintained over a power-cycle of the EMS. Further, changes of the operating parameters input via the HMI can be maintained even when communications over the communication network linking the engine.

19 Claims, 7 Drawing Sheets

Related U.S. Application Data

(60) Provisional application No. 61/581,933, filed on Dec. 30, 2011.

(51) Int. Cl.
*G05B 19/042* (2006.01)
*H02P 101/45* (2016.01)

(52) U.S. Cl.
CPC .............. *G05B 2219/25059* (2013.01); *G05B 2219/25066* (2013.01); *G05B 2219/25081* (2013.01); *G05B 2219/25106* (2013.01); *H02P 2101/45* (2015.01)

(58) Field of Classification Search
CPC ........... G05B 2219/25066; G05B 2219/25106; H02P 2101/45
See application file for complete search history.

(56) References Cited

U.S. PATENT DOCUMENTS

| | | | |
|---|---|---|---|
| 6,631,310 B1* | 10/2003 | Leslie | H02P 9/00 700/21 |
| 8,521,348 B1* | 8/2013 | Walser | B63J 99/00 440/1 |
| 9,052,717 B1* | 6/2015 | Walser | B60W 10/06 |
| 2002/0046266 A1 | 4/2002 | Muralidhar et al. | |
| 2003/0088834 A1* | 5/2003 | Murakami | G11B 5/012 360/39 |
| 2004/0242091 A1* | 12/2004 | Okuyama | B63H 21/21 440/86 |
| 2006/0233119 A1 | 10/2006 | Cline | |
| 2007/0016586 A1* | 1/2007 | Samji | G06F 17/30235 |
| 2007/0129812 A1 | 6/2007 | Ferchau | |
| 2009/0228611 A1 | 9/2009 | Ferguson et al. | |
| 2010/0094490 A1 | 4/2010 | Alston et al. | |
| 2011/0295436 A1 | 12/2011 | Haynes et al. | |

FOREIGN PATENT DOCUMENTS

| | | |
|---|---|---|
| DE | 102009027949 A1 | 1/2011 |
| EP | 1688840 A2 | 8/2006 |
| JP | 58148696 A | 9/1983 |
| JP | 956006 A | 2/1997 |
| JP | 10103592 A | 4/1998 |
| JP | 2000116195 A | 4/2000 |
| JP | 2002004887 A | 1/2002 |
| JP | 2003041973 A | 2/2003 |
| JP | 2004227392 A | 8/2004 |
| JP | 2007241490 A | 9/2007 |
| JP | 2007318940 A | 12/2007 |
| JP | 2011229219 A | 11/2011 |
| WO | 0139352 A1 | 5/2001 |

OTHER PUBLICATIONS

Unofficial English Translation of Japanese Office Action issued in connection with corresponding JP Application No. 2014550317 on Apr. 28, 2015.
Unofficial English Translation of Chinese Office Action issued in connection with corresponding CN Application No. 201280065549.8 on Nov. 24, 2015.
Unofficial English Translation of Japanese Notice of Allowance issued in connection with corresponding JP Application No. 2014550317 on Aug. 18, 2015.

* cited by examiner

SYSTEM, METHOD, AND COMPUTER PROGRAM FOR AN INTEGRATED HUMAN-MACHINE INTERFACE (HMI) OF AN ENGINE-GENERATOR

CROSS-REFERENCE TO RELATED APPLICATIONS

This application is a divisional of and claims priority to U.S. application Ser. No. 13/664,566, filed Oct. 31, 2012 (the "'566 Application"), which claims priority to U.S. Provisional Application Ser. No. 61/581,933, filed on 30 Dec. 2011 (the "'933 Application"). The entire disclosures of the '933 Application and the '566 Application are incorporated by reference.

BACKGROUND

The inventive subject matter described herein relates to the field of vehicle engine and power generation systems and, more particularly, to a system, method, and computer program for an integrated human-machine interface (HMI) for an engine generator, such as an engine generator of a vehicle propulsion system.

A power generation system of a vehicle (such as a marine vessel) may include multiple engine-generators operating singularly and/or in parallel. Typically, the operation of each engine-generator is monitored and adjusted by a management system to account for fluctuations in usage and environmental variables. While this type of adjustment is performed automatically by the management system during operation, engine-generators need to be maintained and periodically tuned in order to provide sufficient power for the vehicle.

Power generation systems may operate according to operator-defined parameters. Upon initial installation of a power generation system, the parameters may be set to default values. Some of these parameters, however, may be varied from the default values in order to provide improved engine performance. For example, the default limits used for the air-to-fuel ratio of an engine-generator may be varied to improve the efficiency of the engine-generator. In order to vary these parameters in some known power generation systems, however, typically an engineer from the manufacturer or provider of the power generation system must travel to the location of the power generation system. This engineer also typically has specialized equipment, such as a portable computer with specialized software stored thereon, that is used to tune (e.g., adjust) one or more of the parameters of the power generation system. The system may not permit the day-to-day operators of the system to modify the parameters. As a result, significant time and expense may be expended in requiring personnel from the manufacturer or provider (or other third party) to travel to the location of the system and/or to use specialized equipment to modify the parameters. Additionally, the ability to configure the operating parameters is dependent upon the working condition of the laptop computer, the data cable, and the software application. An error or failure with any of these three auxiliary components results in the improper configuration of, or the inability to configure, the engine-generator. Additionally, engines of a vehicle, such as a marine vessel, are often controlled using multiple control panels, which must communicate with each other to properly function. Conditions of a vehicle, however, can result in communications being somewhat inconsistent, which can result in problems with controlling and/or maintaining the vessel's engines.

Further, in power generation systems having multiple engine-generators, such as those responsible for vehicle propulsion, a technician may need to perform the same configuration process for each engine-generator. The repetitive nature of this task, especially when coupled with a large quantity of operating parameters, can be prone to entry errors by the technician. Additionally, calibrating and maintaining the engines of a vessel, can be expensive and time consuming. Since a technician is required to make changes to the operating parameters of conventional engine-generators, customers may be largely completely reliant upon the responsiveness of technicians to make even relatively minor changes.

BRIEF DESCRIPTION

In one aspect of the disclosure, a method, system, apparatus, and/or computer program can configure the operating parameters of an engine-generator, such as engine parameters. In this aspect, a value of at least one of a set of configurable operating parameters for a first engine-generator can be modified using a human-machine interface (HMI). The HMI can be an integrated component of the first engine-generator. For example, the HMI may be provided by the engine-generator and not on a computing device that is external to the engine-generator. The HMI can be utilized by an engine management system overseeing operation of the first engine-generator. The modified value of the at least one the set of configurable operating parameters local to the first engine-generator can be saved. A configuration file comprising the set of configurable operating parameters can be generated using the engine management system. Configurable operating parameters whose values have been modified and configurable operating parameters whose values remain unmodified can be included in the configuration file. The configuration file can be transferred from the first engine-generator to a second engine-generator. The second engine-generator can be operationally similar to the first engine-generator. The engine management system of the second engine-generator can be capable of reading the configuration file stored by the engine management system of the first engine-generator. Values for a set of configurable operating parameters associated with the second engine-generator can be replaced with values for the set of configurable operating parameters contained within the configuration file. The second engine-generator can be automatically configured to match the first engine-generator.

In one aspect of the disclosure, a method, system, apparatus, and/or computer program can configure an engine-generator. This aspect can include a master controller, a set of configurable parameters, an integrated HMI, and an engine management system. The master controller can manage performance of a set of engine-generators of a power generation system. The master controller can provide values for a set of operating parameters to the plurality of engine-generators. Configurable operating parameters for an engine-generator can be stored in a tangible storage medium. Changes to values of the configurable operating parameters can affect operation of the engine-generator. The configurable operating parameters can be a subset of operating parameters utilized by the master controller and/or the engine-generator. The integrated HMI can facilitate modification of the configurable operating parameters for the engine-generator. The integrated HMI can be incorporated into the engine-generator. The engine management system can monitor and adjust operation of the engine-generator based upon the configurable operating parameters and the operating parameters provided by the master controller.

One aspect of the disclosure can be a method, system, apparatus, and/or computer program for improving engine-generator performance. In this aspect, an inability to communicate with a master controller by an engine management system of an engine-generator can be detected. A state of the engine-generator can be determined. The state can include at least a power-up state, an in-operation state, and a power-down state. When the state of the engine-generator is determined to be the power-up state, operating parameters can be assessed from a non-volatile memory store of the engine management system. The configurable operating parameters can be stored during a previous operation cycle of the engine-generator. The configurable operating parameters can be utilized by the engine management system to manage operation of the engine-generator when the engine-generator transitions to the in-operation state. Use of the configurable operating parameters can continue until one of the engine management system re-establishes communication with the master controller and the engine-generator transitions to the power-down state.

Another aspect of the disclosure is for a method, system, apparatus, or computer program product for handling operating parameters used in a vehicle propulsion system, such as a propulsion system for a marine vessel. In this aspect, an engine management system (EMS) can be provided. The EMS can be equipped with an integrated human machine interface (HMI) through which operating parameters of at least one engine-generator used to propel a vehicle (such as a marine vessel) are able to be tuned. The EMS can be communicatively linked over a communication network with an engine control unit (ECU). The ECU can be a standalone system operable independent of the EMS that utilizes operating parameters to control operation of the engine generators. User input can be received from an authorized user of the HMI. The input can be for adjusting at least one of the operating parameters that controls operation of the engine generator(s). At least one message or signal can be conveyed based on the input over the communication network between the engine management system (EMS) and the engine control unit (ECU). The communication network can be an Attached Resource Computer network (ARCNet) in one embodiment. At least one of the operating parameters used by the ECU can be changed in accordance with the user input from the HMI. The changes of the operating parameters input via the HMI can be maintained over a power-cycle of the EMS. The changes of the operating parameters input via the HMI can also be maintained even when communications over the communication network linking the EMS to the ECU are disrupted.

Another aspect of the disclosure is for a method, system, apparatus, or computer program product for handling operating parameters used in a marine vessel propulsion system. In this aspect, upon engine control power-up, operating parameters used by an ECU can be read from a non-volatile memory. A status of a communication network linking an EMS to the ECU can be checked. When the communication network is not operational, the operating parameters from the non-volatile storage can be utilize to control at least one engine generator. When the communications network is operational, operational values can be received from the EMS, which are used to update the operational values of the ECU to match those received from the EMS. When the communications network is operational, user input can be received from the authorized user of a HMI. This input can be conveyed over the communication network and used to change values of the operating parameters of the ECU. The operating parameters of the ECU can be stored in the non-volatile memory used by the ECU.

In one embodiment, a method (e.g., for controlling operations of one or more engine-generators) includes modifying one or more values of a first set of plural configurable operating parameters for a first engine-generator. The first engine-generator includes an integrated human-machine interface (HMI) and a first engine management system. The configurable operating parameters are utilized by the first engine management system to control operations of the first engine-generator. The one or more values of the first set are modified based on user operation of the HMI. The method also includes locally saving the one or more values of the first set of the configurable engine parameters that are modified. The one or more values that are modified are saved to a memory that is local to the first engine-generator. The method further includes transferring the first set of configurable operating parameters, including the one or more values of the configurable operating parameters that are modified, from the first engine-generator to a separate and distinct second engine-generator and replacing one or more values of a second set of plural configurable operating parameters associated with the second engine-generator with the one or more values of the first set of configurable operating parameters that are modified. The second engine-generator operates using the one or more values of the second set of configurable operating parameters that are obtained from the first engine-generator.

In one embodiment, a system (e.g., a power generation system) includes a first engine-generator having an engine, a generator coupled to the engine, at least one storage medium, an integrated human-machine interface (HMI), and an engine management system. Operation of the engine runs the generator for generating electricity. The at least one storage medium is configured to store at least a first subset of plural operating parameters that are used to control operations of the first engine-generator. One or more of the operating parameters of the first subset are configurable. The HMI is integrated in the first engine-generator and is configured to receive input from an operator to modify the one or more configurable operating parameters of the first subset. The engine management system is configured to control operations of the first engine-generator based upon the one or more configurable operating parameters that are modified using the HMI.

In one embodiment, a method (e.g., for controlling operations of an engine-generator) includes detecting of an inability of an engine management system to communicate with a master controller. The engine management system is configured to control operations of an engine-generator. The master controller is configured to provide values of a first set of operating parameters of the engine-generator that are used to control the operations of the engine-generator by the engine management system. The method also includes determining an operating state of the engine-generator as being at least one of a power-up state, an in-operation state, or a power-down state and accessing one or more configurable operating parameters of the first set of operating parameters from a non-volatile memory store of the engine management system when the operating state of the engine-generator is the power-up state. The one or more configurable operating parameters were previously stored in the non-volatile memory store during a previous operation cycle of the engine-generator. The method further includes utilizing the one or more configurable operating parameters by the engine management system to control the operations of the engine-generator when the engine-generator transitions to the in-operation state. Utilization of the one or more configurable operating parameters continues until communication between the engine management system and the master controller is re-established.

In one embodiment, a method (e.g., for managing an engine control unit) includes managing a first engine control unit (ECU) with an engine management system (EMS) having an integrated human machine interface (HMI) through which operating parameters of a first engine-generator are able to be modified. The EMS is configured to be communicatively linked over a communication network with the first ECU. The first ECU controls operations of the first engine-generator using the operating parameters.

In one embodiment, a system (e.g., a power generation system) includes an engine management system (EMS), an engine control unit (ECU), and a non-volatile memory device. The EMS has an integrated human machine interface (HMI) that is configured to receive input from users to modify one or more operating parameters of a plurality of engine generators of a power generation system. The ECU is configured to control operations of the plurality of engine-generators based on the operating parameters, including the one or more operating parameters that are to be modified based on the input from the users. The ECU and EMS are configured to be communicatively linked by a communication network in order to communicate the operating parameters. The non-volatile memory device is configured to store the one or more operating parameters that are modified. Changes to the one or more operating parameters that are input via the HMI are maintained on the memory device over a power-cycle of the EMS and when communications over the communication network linking the EMS to the ECU are disrupted.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
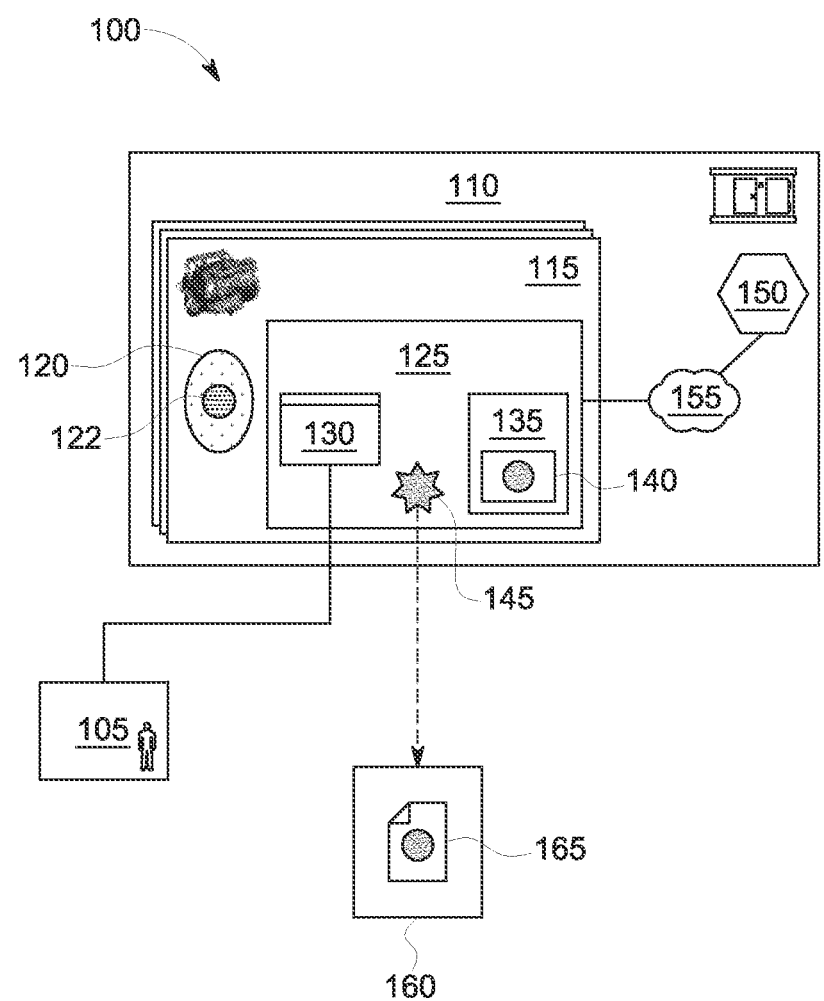
FIG. 1 is a schematic diagram illustrating a system that utilizes an integrated human-machine interface (HMI) to allow a user to modify the configurable operating parameters for an engine-generator of a power generation system, according to an embodiment of the invention.

The present disclosure provides a solution for configuring an engine-generator, such as a set of engine-generators of a vehicle (e.g., a marine vessel or other vehicle), using an integrated human-machine interface (HMI). The HMI can be adapted for use with a variety of different engine control units and can store parameters in a common format and database structure. That is, the HMI interface can be a standardized interface (e.g., a standards-based interface) able to be used for a variety of systems provided or manufactured by different entities, which represents an improvement over current practices where multiple different proprietary human-machine interfaces are required (which requires training on each interface, instrumentation of a variety of interfaces, multiple tools for the different interfaces, etc.).

The HMI can provide different levels of access to different categories of users, such as technicians, captains, and engineers. Users can authorize themselves for their appropriate access levels by providing suitable passwords or other authentication artifacts (e.g., digital certificates, access key, biometric input, etc.). Each of the different categories of user can access and modify operating parameters of an engine management system from the HMI. In one embodiment, the operating parameters can be stored in a non-volatile memory of an engine control unit (ECU) and also within a remotely located configuration file of an engine management system. For example, all changed/unchanged field configurable parameters can be obtained from a memory of the engine control unit (ECU) and used to update a configuration file of the engine management system. In the event of ECU power-up without communications over a network connection (e.g., Attached Resource Computer network or ARCNet) with a master controller, some key engine performance and health parameters can be saved in the ECU's nonvolatile memory, which can be immediately utilized until the network or other communication connection becomes available.

Aspects of the inventive subject matter may be embodied as a system, method, or computer program product. Accordingly, aspects of the inventive subject matter may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a tangible and non-transitory computer readable storage medium. A computer readable storage medium may be, for example, but not limited to, an electronic, magnetic, optical, electromagnetic, infrared, or semiconductor system, apparatus, or device, or any suitable combination of the foregoing. For example, in embodiments, a Universal Serial Bus (USB) flash drive may be used to move engine control data between a non-volatile memory of the engine control unit and a configuration file of the engine management system. In one embodiment, the HMI can permit information to be directly uploaded and downloaded, such as to or from a USB flash drive. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain/store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Higher level programming languages can also be used, such as MATLAB, SIMULINK, and the like. The program code may execute entirely on the user's computer (e.g., local computer), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet service provider).

Aspects of the inventive subject matter are described below with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a configuration system 100 that utilizes an integrated human-machine interface (HMI) 130 to allow a user 105 to modify configurable operating parameters 122 for an engine-generator 115 of a power generation system 110, in accordance with embodiments of the invention.

In the system 100, values for the configurable operating parameters 122 of the engine-generators 115 can be adjusted by the user 105 via the integrated HMI 130. User 105 can represent a human agent (e.g., technician, engineer, maintenance personnel, system manager, or the like) associated with the power generation system 110 having the knowledge and authorization to modify the operating parameters 122 of the engine-generator 115. In one embodiment, the user 105 may be disposed locally relative to the system 100 in order to adjust the parameters 122. For example, the user 105 may be located in the same room, building, or the like, as the engine-generators 115. Alternatively, the user 105 may be located remote from the engine-generators 115. For example, the user 105 may be located in another building, city, county, state, country, and/or continent. The user 105 can remotely coach an on-site user (e.g., another user 105 that is located at the engine-generators 115) to adjust the parameters 122 of the engine-generators 115.

The power generation system 110 can represent the hardware and/or software components used to generate electricity from alternate forms of energy (e.g., gasoline, diesel, bio-diesel, hydrogen, etc.). The power generation system 110 can be a permanent or semi-permanent structure at a geographic location designed for the production and distribution of electricity like an on-site small-scale power plant to provide emergency power to a factory. Alternatively, the power generation system 110 may be a propulsion system of a vehicle, such as a marine vessel, automobile, rail vehicle (e.g., locomotive), other off-highway vehicle (e.g., a vehicle that is not designed or permitted to travel on public roadways), and the like.

The power generation system 110 can include structural components (not shown) like a foundation, walls, and roofing to protect internal elements from the external environment. The specific physical external and internal configurations of the various components that can comprise a power generation system 110 may vary considerably.

Components of the power generation system 110 of particular relevance to at least one embodiment described herein can include one or more engine-generators 115, an engine management system 125, and a master controller 150. An engine-generator 115 can represent the assemblage of components required for converting a fuel source into electricity. The specific configuration of components of an engine-generator 115 can vary based on manufacturer and purpose. In at least one embodiment, the engine-generator 115 includes a fuel source, an engine, a constant engine speed regulator (e.g., governor), a generator, a generator voltage regulator, as well as systems for handling exhaust, cooling, and lubrication.

The operating parameters 120 of many mid- or large-scale engine-generators 115 can be constantly or at least repeatedly monitored and automatically adjusted by an engine management system 125. The operating parameters 120 can represent values or limits for input/output variables for the engine-generator 115. The engine management system 125 can utilize the values of the operating parameters 120 when determining when and/or how operation of the engine-generator 115 should be adjusted.

For example, should the engine management system 125 determine that the operating speed of the engine component needs to be increased in order to increase power generation, the engine management system 125 can accelerate the engine based upon the "increase speed acceleration rate" operating parameter 120.

A subset of the operating parameters 120 can be designated as configurable operating parameters 122. Values for the configurable operating parameters 122 can be modified by the user 105 for the purposes of calibrating/tuning operation of the engine-generator 115. Conversely, values of the operating parameters 120 not included in the subset of configurable operating parameters 122 cannot be modified by the user 105. In embodiments, all the operating parameters are configurable operating parameters.

Examples of configurable operating parameters 122 can include, but are not limited to, limits on air-to-fuel ratios used by the engine-generators 115, static fuel limit values (e.g., limits on how much fuel is provided per cylinder of the engine-generator 115), increase speed acceleration rate (e.g., limit on acceleration of the engine), decrease speed deceleration rate (e.g., limit on deceleration of the engine), percent droop, load control proportional integral gain of the engine, idle rated calibration points, and the like. Definition of the configurable operating parameters 122 can occur during production of the engine-generator 115 and can allow for further customization by the user 105 after installation.

The engine management system 125 can represent the hardware and/or software elements required to monitor and adjust the operating parameters 120 of the engine-generator 115. The engine management system 125 can be comprised of a variety of components without detracting from the spirit of the present invention. In system 100, however, only those components of the engine management system 125 directly involved with the implementation and/or functionality of the illustrated embodiment of the inventive subject matter have been illustrated.

As such, the engine management system 125 can include the integrated HMI 130, an engine control unit (ECU) 135, and an input/output (I/O) module 145. The integrated HMI 130 can represent the hardware and/or software required to provide a graphical interaction mechanism in which the user 105 can perform functions relating to the configurable operating parameters 122 of the engine-generator 115.

As used herein, the term "integrated" with respect to the integrated HMI 130 is used to emphasize that the elements of the HMI 130 are integrated into the engine-generator 115. That is, the user 105 does not need any additional hardware and/or software in order to complete, represent, or perform the functions of the integrated HMI 130. As one example of an integrated HMI 130, the HMI 130 may be a part of the engine-generator 115 such that the HMI 130 cannot be separated from the engine-generator 115 or system 110. For example, the HMI 130 may not be disposed onboard a device that is physically separate and distinct from the engine-generator 115 or system 110, in one embodiment. By "separate and distinct," it is meant that devices that are separate and distinct may not be mechanically or electrically (e.g., conductively) coupled with each other directly or by one or more intermediate components. Additionally or alternatively, "separate and distinct" devices may be controlled differently by the same or different controllers and/or the outputs of the separate and distinct devices may be used differently. For example, a first engine-generator may be separate and distinct from a second engine-generator if the first and second engine-generators are not mechanically linked or interconnected with each other, the first and second engine-generators are not conductively coupled with each other such that the output current from the first and second engine-generators is not combined or transferred on the same bus, the first and second engine-generators are controlled by different controllers, and/or the current that is output from each of the first and second engine-generators is used to power a different load.

The integrated HMI 130 can include a display screen and keypad encased within the housing of the engine-generator 115. The components supporting the processing logic and graphical menus of the integrated HMI 130 can also be accommodated within an appropriate location of the housing of the engine-generator 115, like a designated control area where the sensitive components can be protected from the environmental stresses of operation (e.g., heat and vibration).

The integrated HMI 130 may be a robust interface and not a "dumb" terminal or control panel that is merely used to control operations of the engine-generator 115. While the engine-generator 115 may still have a control panel for quick access to functions like power up/off and emergency stop, the integrated HMI 130 can be configured to be utilized by the user 105 to calibrate or fine-tune values for the configurable operating parameters 122 of the engine-generator 115 in the field (post-installation). In contrast, the ECU 135 may be used to control operations of the engine-generator 115, but may not be able to modify or fine-tune values of the parameters 122.

The conventional process for calibrating/tuning an engine-generator 115 in the field can require a specially-trained or certified technician 105 having a specialized software application running on an electronic device (e.g., laptop or specialized computing device) that would be separate from the engine-generator 115 prior to calibrating the engine-generator 115, but then physically connected with the engine-generator 115 during the calibration, such as by one or more cables. Use of the integrated HMI 130 can allow the owner/operating entity of the power generation system 110 overcome key problems with this conventional approach.

First, the integrated HMI 130 can allow a knowledgeable employee 105 like a power engineer to make changes to the configurable operating parameters 122 to calibrate or tune the engine-generator 115. This can save time and money spent waiting for a technician of a third party to travel to the location of the system 110, as well as increase the response time in which changes to the configurable operating parameters 122 can be made, improving the overall effectiveness of the calibration/tuning process.

Second, since the HMI 130 is an integrated component of the engine-generator 115, this improved process can eliminate dependence upon the specialized auxiliary components associated with the conventional approach. With the conventional approach, should a failure or error occur with the technician's 105 software application, electronic device, and/or cable connecting the electronic device, the process cannot proceed. While the potential for error cannot be completely eliminated, the integrated HMI 130 can reduce problems incurred by faulty or mishandled auxiliary components.

Third, a remotely located technician can coach a user 105 to calibrate the parameters 122 without the user 105 having knowledge of how to do so and without the technician having to travel to the location of the system 110. As no specialized or separate hardware may be required to calibrate the system 110 in one embodiment, the technician can remotely coach the user 105 over a telephone connection, video connection, or other communication connection.

Changes made by the user 105 to a configurable operating parameter 122 via the integrated HMI 130 can be stored by the engine management system 125 in a non-volatile memory 140 component of the ECU 135. The ECU 135 can represent the hardware and/or software components required to electronically monitor and control operation of the components of the engine-generator 115.

Thus, in addition to sensors (not shown) that monitor operations of the system 110 and logic processing components (e.g., processor(s)), the ECU 135 can include the non-volatile memory 140 component for storing the configurable operating parameters 122. The type of non-volatile memory 140 can be capable of read and write operations like a flash memory unit. Non-volatile memory 140 allowing read/write operations can be required to allow for the storage of changes made to the values of the configurable operating parameters 122.

Storage of the configurable operating parameters 122 to non-volatile memory 140 can be of import should the engine management system 125 and/or ECU 135 lose communication with the master controller 150. The master controller 150 can represent the hardware and/or software components that manage the overall operation of the power generation system 110.

For example, the master controller 150 can adjust or power-up/down engine-generators 115 for load balancing, conformance to operational policies, or to handle a detected problem. Thus, the master controller 150 can provide the engine management system 125 with operating parameters 120 values to accommodate these situations as they arise.

Communication between the engine management system 125 and the master controller 150 can utilize a local and/or secure network 155 using an appropriate communications protocol like the Attached Resource Computer network (ARCnet) protocol that is often used in embedded computing systems. Further, this same network 155 can provide communication among the components 130, 135, and 145 of the engine management system 125 as well as between the components 130, 135, and 145 of the engine management system 125 and the components of the engine-generator 115.

A loss of communication with the master controller 150 during operation can result from a variety of issues like a network or power failure. Regardless of the reason, the engine management system 125 can no longer receive changes to the operating parameters 120 from the master controller 150. While the current values for the configurable operating parameters 122 will get the engine-generator 115 through its current power cycle, it cannot be guaranteed that communication with the master controller 150 will be restored by the next power cycle.

By capturing the configurable operating parameters 122 in the non-volatile memory 140, the modified values can be preserved once the engine-generator 115 powers down. Further, in the case where the engine-generator 115 powers up without communication to the master controller 150, the engine management system 125 can use the stored configurable operating parameters 122 to adjust operation until communication with the master controller 150 is restored.

For example, during operation of the engine management system 125 (e.g., during control of one or more of the engine-generators 115), an inability of the engine management system 125 to communicate with the master controller 150 can be identified. This inability may arise and be detected due to a loss of communication between the engine management system 125 and the master controller 150, such as when one or more messages communicated by the engine management system 125 are not responded to by the master controller 150 and/or a "confirmation of receipt" message is not received by the engine management system 125 from the master controller 150. In response to determining such a loss in communication, the engine management system 125 can determine an operating state of one or more of the engine-generators 115. Each engine-generator 115 may be in a power-up state, an in-operation state, or a power-down state. The power-up state can represent a time period that extends between and includes a time when the engine-generator 115 is activated or otherwise turned on until a time when the engine-generator 115 is operable to generate electric current (e.g., a warming up period). Additionally or alternatively, the power-up state can include a time period prior to the engine-generator 115 receiving operating parameters from the engine management system 125. The in-operation state can represent a subsequent time period when the engine-generator 115 is actually operating to generate the electric current, such as to power one or more loads. The power-down state can represent a subsequent time period when the engine-generator 115 is switched from generating electric current for powering a load to being deactivated, and/or can include a time period when the engine-generator 115 is deactivated (e.g., turned off and not producing electric current). The engine management system 125 can determine the operating state of the engine-generator 115 based on commands received or generated by the engine management system 125, the operating speed of the engine-generator 115 (e.g., the operating speed of the engine), and/or the current that is output from the engine-generator 115. For example, if a previous command that is received by the engine management system 125 or that was sent from the engine management system 125 to the engine-generator 115 was a command that deactivated the engine-generator, and no additional commands to activate the engine-generator 115 have been received or generated, the engine management system 125 may determine that the engine-generator 115 is in the power-down state. Additionally or alternatively, if the operating speed of the engine-generator 115 and/or the output current is less than a first threshold speed or first threshold current, then the engine management system 125 can determine that the engine-generator 115 is in the power-down state.

If the previous command that is received by the engine management system 125 or that was sent from the engine management system 125 to the engine-generator 115 was a command that activated the engine-generator 115, but the engine-generator 115 is not yet operating at a speed that exceeds a threshold speed and/or outputting a current that exceeds a threshold current, then the engine-generator 115 can determine that the engine-generator 115 is in the power-up state.

If the previous command that is received by the engine management system 125 or that was sent from the engine management system 125 to the engine-generator 115 was a command that activated the engine-generator 115, and the engine-generator 115 is operating at a speed that exceeds the threshold speed and/or outputting current that exceeds the threshold current, then the engine-generator 115 can determine that the engine-generator 115 is in the in-operation state.

In one embodiment, if the engine-generator 115 is in the in-operation or power-down state, the engine-generator 115 can continue to operate using the operating parameters 120 and/or 122 provided by the engine management system 125 prior to the loss in communication with the master controller 150. If the engine-generator 115 is in the power-up state, the engine management system 125 can access operating parameters 120 and/or 122 that previously were stored in the memory 140 of the engine management system 125. For example, during a previous operation cycle of the engine-generator 115 (e.g., during a previous cycle that included the power-up state, in-operation state, and power-down state), the engine management system 125 may have stored the operating parameters 120 and/or 122 on the memory store 140. Once the loss in communication occurs, the engine management system 125 can use the previously stored operating parameters 120 and/or 122 in the memory store 140 control the engine-generator 115 that is in the power-up state and/or transitioning to the in-operation state. These previously stored operating parameters 120 and/or 122 may continue to be used to control operations of the engine-generator 115 until communication is re-established between the engine management system 125 and the master controller 150 (e.g., so that the engine management system 125 can obtain new or different parameters 120 and/or 122 from the master controller 150). Additionally or alternatively, the engine management system 125 may continue to use the previously stored operating parameters 120 and/or 122 until the engine-generator 115 transitions to the power-down state. Storage of the configurable operating parameters 122 can also support an up/down load functionality to assist in the calibration of multiple engine-generators 115. Upon selection of the corresponding command by the user 105, the engine management system 125 can package the configurable operating parameters 122 as a configuration file 165. The configuration file 165 can be a formatted electronic representation of the configurable operating parameters 122 that the engine management system 125 can read and write.

A data storage device 160 can then be connected to the engine management system 125 via the I/O module 145. The I/O module 145 can represent the hardware and/or software components required to support communication with external devices like the data storage device 160. The I/O module 145 can include one or more ports that support connection to the external device directly or through the use of an appropriate data cable.

The data storage device 160 can be an electronic device capable of connecting to the I/O module 145 and storing the configuration file 165. For example, a portable flash memory device 160 (e.g., thumb drive or memory stick) can be directly connected to the I/O module 145. As another example, the data storage device 160 can be represented by a laptop computer connected to the I/O module 145 using a USB data cable.

The data storage device 160 can then be connected to other engine-generators 115 predetermined as identical or comparable to the engine-generator 115 that created the configuration file 165. The configuration file 165 can be uploaded by the engine management system 125 of the other engine-generators 115 to provide quick and uniform calibration.

Network 155 can include any hardware/software/and firmware necessary to convey data encoded within carrier waves. Data can be contained within analog or digital signals and conveyed though data or voice channels. Network 155 can include local components and data pathways necessary for communications to be exchanged among computing device components and between integrated device components and peripheral devices. Network 155 can also include network equipment, such as routers, data lines, hubs, and intermediary servers which together form a data network, such as the Internet. Network 155 can include line based and/or wireless communication pathways.

Figure 2:
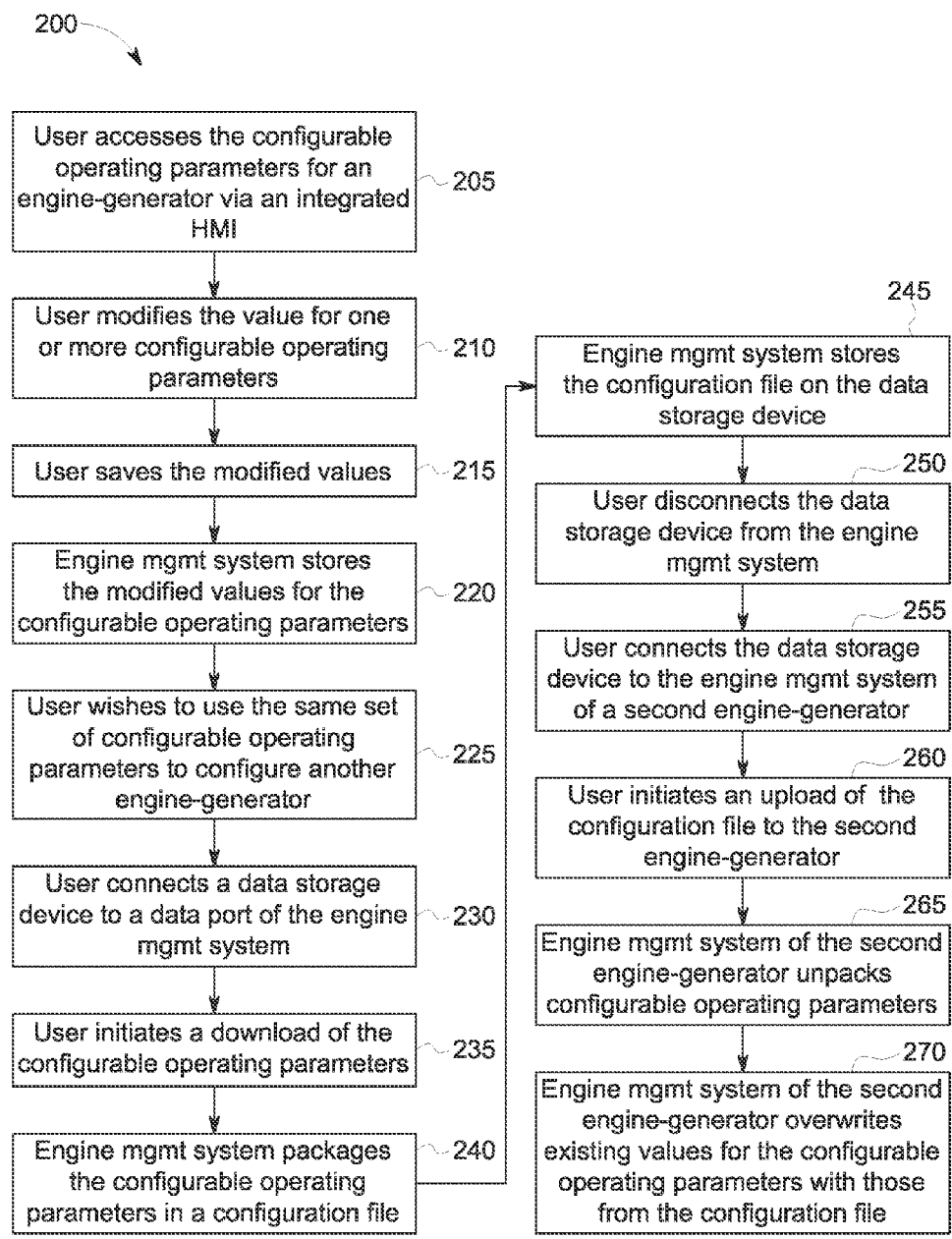
FIG. 2 is a flow chart of a method detailing the calibration of multiple engine-generators using an integrated human-machine interface (HMI), according to an embodiment of the invention.

FIG. 2 is a flow chart of one embodiment of a method 200 for calibration of multiple engine-generators using an integrated human-machine interface (HMI) in accordance with embodiments of the invention. Method 200 can be performed within the context of system 100.

At 205, a user can access the configurable operating parameters for an engine-generator via an integrated HMI. At 210, the user can modify the value of one or more configurable operating parameters. At 215, the modified values of the configurable operating parameters can be saved by the user.

At 220, the engine management system can store the modified values for the configurable operating parameters. The modified values can be stored to a local volatile memory store (e.g., a working cache), as well as to the non-volatile memory component of the ECU. For example, the modified values can be locally stored when the values are stored in a memory (e.g., a computer readable storage medium) that is coupled to and/or is an integrated part of the ECU, as opposed to being a separate and distinct component or device. At 225, the user can desire to use the same set of configurable operating parameters to configure another engine-generator. For example, the user may transfer the set of configurable operating parameters of a first engine-generator (including one or more values of the configurable operating parameters that are modified) to another, second engine-generator that is separate and distinct from the first engine-generator.

At 230, the user can connect a data storage device to a data port of the engine management system in step 230. At 235, the user can initiate a download of the configurable operating parameters. The operating parameters that are downloaded can include one or more values of the operating parameters that are modified. At 240, the engine management system can package the configurable operating parameters in a configuration file. Alternatively, the operating parameters may be saved in another format or manner.

At 245, the engine management system can store the configuration file to the data storage device. At 250, the user can disconnect the data storage device from the engine management system. At 255, the user can connect the data storage device to the engine management system of a second engine-generator.

At 260, the user can initiate an upload of the configuration file to the second engine-generator. For example, the operating parameters that are used for the first engine-generator can be transferred to the second engine-generator by uploading the operating parameters that were saved onto the data storage device. At 265, the engine management system of the second engine-generator can unpack the configurable operating parameters from the configuration file. At 270, the engine management system of the second engine-generator can then overwrite any existing values for the configurable operating parameters with those unpacked from the configuration file.

In one embodiment and as described above, the method 200 comprises transferring the first set of configurable engine parameters, including the one or more values of the configurable engine parameters that are modified, from the first engine-generator to a separate and distinct second engine-generator, and the step of transferring may include the sub-steps of 225-265

Figure 3:
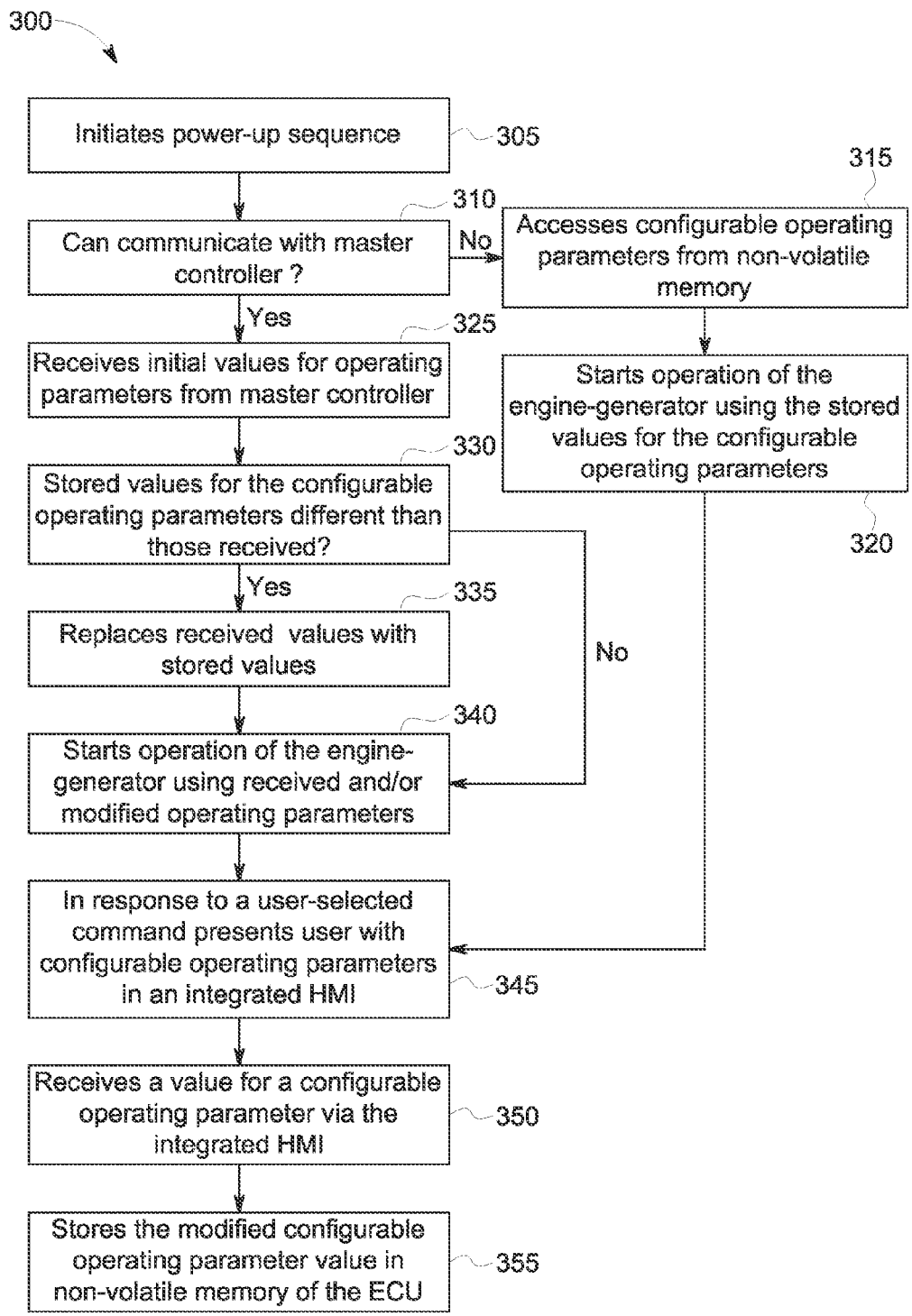
FIG. 3 is a flow chart of a method describing the functionality of the engine management system, according to an embodiment of the invention.

FIG. 3 is a flow chart of one embodiment of a method 300 describing the functionality of the engine management system in accordance with one or more embodiments of the invention. Method 300 can be performed within the context of system 100 and/or in conjunction with method 200.

At 305, the engine management system can initiate a power-up sequence. At 310, a determination is made as to whether the engine management system can communicate with the master controller.

At 315, when the engine management system cannot communicate with the master controller, the engine management system can access the configurable operating parameters from the non-volatile memory of the ECU. At 320, operation of the engine-generator can then be started using the stored values for the configurable operating parameters.

At 325, when the engine management system can communicate with the master controller, initial values for the operating parameters can be received from the master controller. At 330, a determination can be made as to whether any of the stored values for the configurable operating parameters are different that the values received from the master controller.

At 335, when there is a difference in values for the same parameter, the received values can be replaced with the stored values. From 335 or when there is no difference between the received and stored values, at 340, operation of the engine-generator can be started using the received and/or modified operating parameters.

At 345, the engine management system can present the user with the configurable operating parameters in the integrated HMI in response to a user-selected command. At 350, a value for a configurable operating parameter can be received via the integrated HMI. At 355, the modified configurable operating parameter value can then be stored in the non-volatile memory component of the ECU.

It should be noted that the data acquisition process (e.g., at 350) can utilize functions inherent to many typical engine management systems like error handling and out-of-range checking. The integrated HMI can be configured to handle the presentation of the feedback from such functions.

Figure 4:
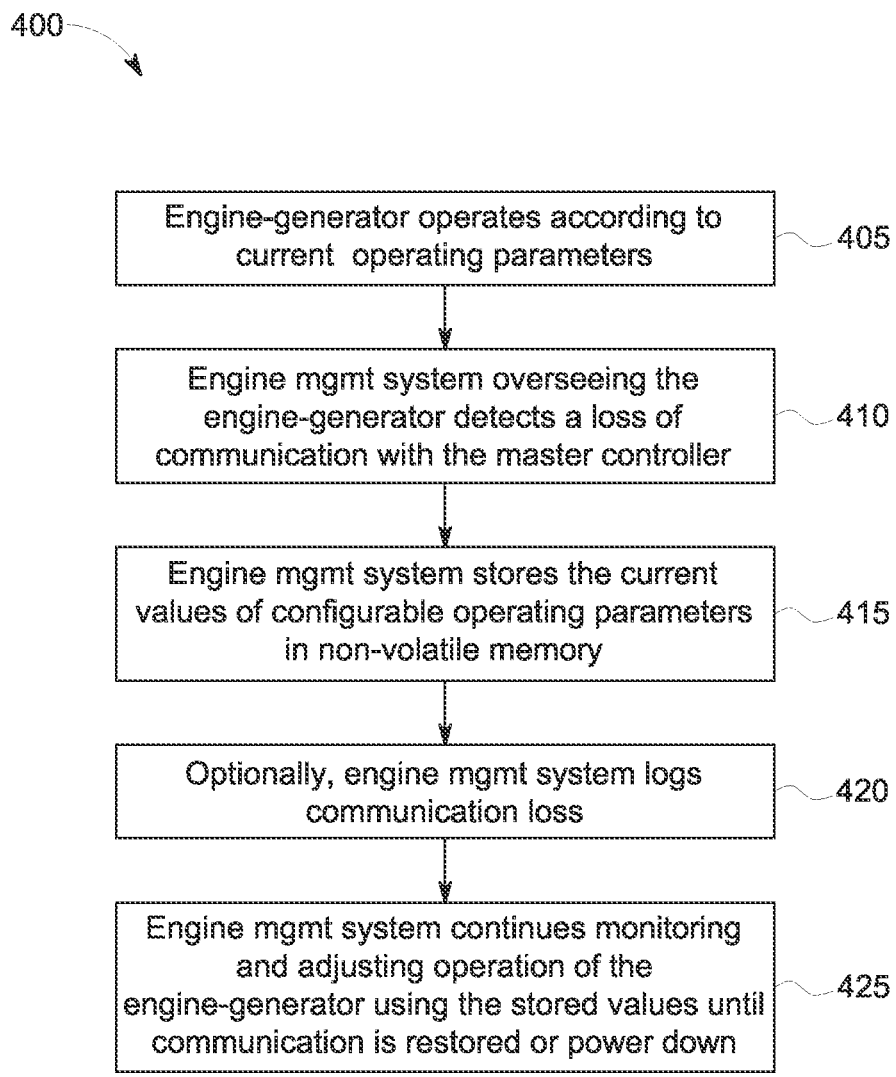
FIG. 4 is a flow chart of a method illustrating the function of the engine management system when communication is lost with the master controller, according to an embodiment of the invention.

FIG. 4 is a flow chart of a method 400 illustrating the function of the engine management system when communication is lost with the master controller, in accordance with embodiments of the invention. Method 400 can be performed within the context of system 100 and/or in conjunction with methods 200 and/or 300.

At 405, the engine-generator can operate according to its current set of operating parameters. At 410, the engine management system overseeing operation of the engine-generator can detect a loss of communication with the master controller.

At 415, the engine management system can store the current values of the configurable operating parameters in the non-volatile memory of the ECU. At 420, the engine management system can optionally log information about the communication loss should the engine management system be configured to do so.

At 425, the engine management system can continue to monitor and adjust operation of the engine-generator using the stored values until communication is restored to the master controller or the end of the power cycle is reached and the engine-generator powers down.

Figure 5:
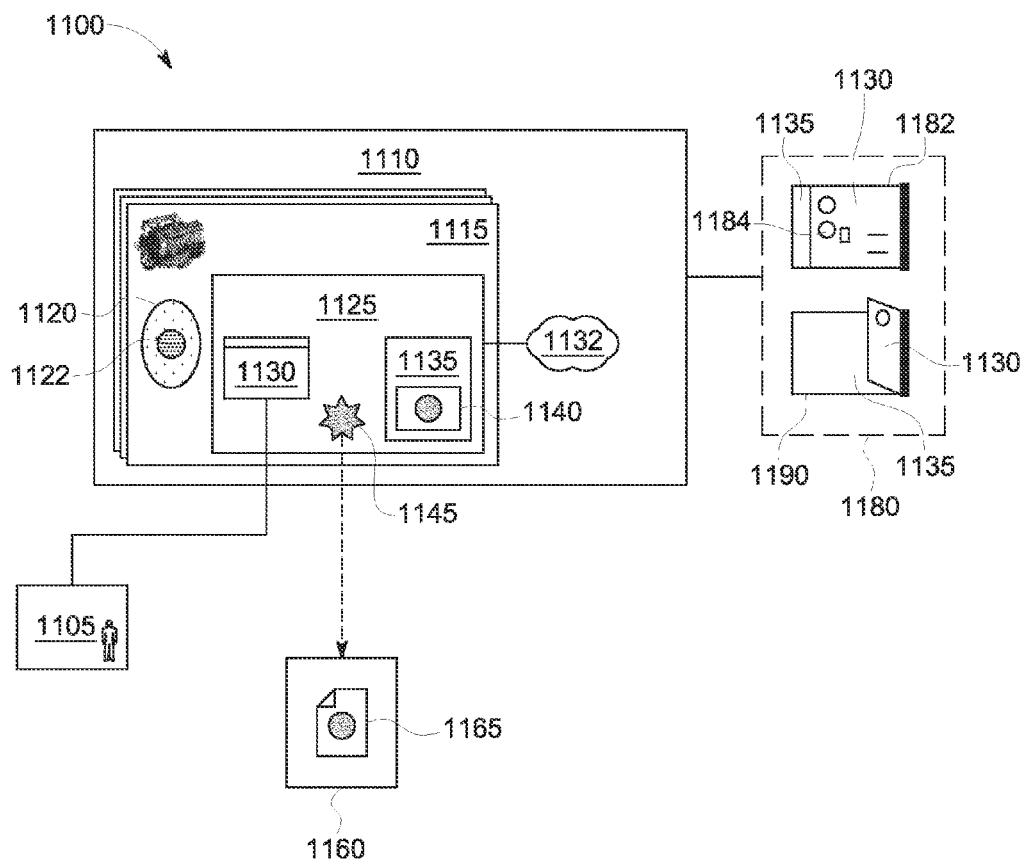
FIG. 5 is a schematic diagram illustrating a system that utilizes an integrated human-machine interface (HMI) for an engine-generator of a power generation system, according to an embodiment of the invention.

FIG. 5 is a schematic diagram illustrating a system 1100 that utilizes an integrated human-machine interface (HMI) 1130 for an engine-generator 1115 of a power generation system 1110 in accordance with embodiments of the invention. In one embodiment, the power generation system 1110 can be a vehicle propulsion system, such as a marine vessel propulsion system, where each engine-generator 1115 is a vehicle propulsion engine.

The human-machine interface (HMI) 1130 can be an interface able to be used by a set of users 1105 (e.g., technicians, engineers, system manager, vessel operators, etc.) to tune, calibrate, optimize, view, and edit operating parameters 1120 of each of the engine generators 1115. That is, values for the configurable operating parameters 1122 of the engine-generators 1115 comprising a power generation system 1110 can be adjusted by a user 1105 via an integrated HMI 1130.

In one embodiment, the power generation system 1110 can represent the hardware and/or software components of a vehicle generator set (e.g., vehicle genset) or a marine direct drive propeller. In another embodiment, the power generation system 1110 can represent any system able to generate electricity from alternate forms of energy (e.g., gasoline, diesel, bio-diesel, hydrogen, etc.). For example, the power generation system 1110 can be a permanent or semi-permanent structure at a geographic location designed for the production and distribution of electricity, like an on-site small scale power plant to provide emergency power to a factory.

The power generation system 1110 can include typical structural components (not shown) like a foundation, walls, and roofing to protect internal elements from the external environment. The specific physical external and internal configurations of the various components that can comprise a power generation system 1110 can vary. A non-limiting implementation example for a marine application is shown in view 1180, where system components are integrated into a single panel.

Components of the power generation system 1110 of particular relevance to the present invention can include one or more engine-generators 1115 and an engine management system 1125. An engine-generator 1115 can represent the assemblage of components that convert a fuel source into electricity. The specific configuration of components of an engine-generator 1115 can vary based on manufacturer and purpose. In one embodiment, an engine-generator 1115 includes a fuel source, an engine, an engine speed regulator, a generator, a generator voltage regulator, as well as systems for handling exhaust, cooling and lubrication. In vehicle propulsion applications, the engine speed regulator can be a variable speed regulator, while in other applications, a constant engine speed regulator (e.g., a governor) can be used.

In a vehicle propulsion application, an engine control unit (ECU) 1135 can regulate engine speed from idle to rated based on throttle commands from an operator's location, such as the captain's room (e.g., bridge) in a marine vessel. A speed command is conveyed wirelessly and/or over wiring of a vehicle (e.g., a ship's bridge-to-ECU communications system). The HMI 1130 can be used to calibrate this communication channel (from 4 to 20 mA typically) and throttle-level, which can be any value between idle and rated. Improper calibration of this throttle command can result in the engines operating at non-desired speeds (e.g., speeds other than those selected by an operator), which can result in loss of fuel efficiency and a lack of vehicle responsiveness to directions from an operator.

The operating parameters 1120 of many mid- or large-scale engine-generators 1115 can be constantly monitored and automatically adjusted by an engine management system 1125. The operating parameters 1120 can represent values or limits for input/output variables for the engine-generator 1115. The engine management system 125 can utilize the values of the operating parameters 1120 when determining when and/or how operation of the engine-generator 1115 should be adjusted.

For example, should the engine management system 1125 determine that the operating speed of the engine component needs to be increased in order to increase vehicle speed (e.g., engine power output) and/or power generation, the engine management system 1125 can accelerate the engine based upon the "increase speed acceleration rate" operating parameter 1120. In a marine vessel application, this "increase speed acceleration rate" operating parameter 1120 can be increased responsive to a captain adjusting a throttle on the bridge of the vessel. Adjustments can also be made from the HMI 1130 by maintenance crew users during engine tuning/calibration.

A subset of the operating parameters 1120 can be designated as configurable operating parameters 1122. Values for the configurable operating parameters 1122 can be modified by the user 1105 for the purposes of calibrating/tuning operation of the engine-generator 1115. Conversely, values of the operating parameters 1120 not included in the subset of configurable operating parameters 1122 cannot be modified by the user 1105. In embodiments, all the operating parameters are configurable operating parameters.

Examples of configurable operating parameters 1122 can include, but are not limited to, limits on air-to-fuel ratios used by the engine-generators 1115, static fuel limit values (e.g., limits on how much fuel is provided per cylinder of the engine-generator 1115), increase speed acceleration rate (e.g., limit on acceleration of the engine), decrease speed deceleration rate (e.g., limit on deceleration of the engine), percent droop, load control proportional integral gain of the engine, idle rated calibration points, and the like. Definition of the configurable operating parameters 1122 can occur during production of the engine-generator 1115 and can allow for further customization by the user 105 after installation.

The engine management system 1125 can represent the hardware and/or software elements used to monitor and adjust the operating parameters 1120 of the engine-generator 1115. The engine management system 1125 can be comprised of a variety of components. In the illustrated system 1100, however, only some of the components of the engine management system 1125 directly involved with the implementation and/or functionality are illustrated.

As such, the engine management system 1125 can include the integrated HMI 1130, the ECU 1135, and an input/output (I/O) module 1145. The HMI 1130 can communicate with the ECU 1135 over Attached Resource Computer network (ARCnet) 1132 (or an equivalent communication link, network, or bus). The ECU 1135 can be a separate hardware component that runs the software/firmware components, such as a speed regulator, providing fuel injection commands, etc. The ECU 1135 can run standalone with the already configured parameters (which can be stored in non-volatile memory 1140 to prevent loss of values power loss, a power-up cycle). Thus, in an event of communication loss (a problem with ARCnet 1132) or an HMI 1130 problem, the ECU 1135 can continue to operate (using a last established set of parameters 1122) until communications with the HMI 1130 are restored (which can update the parameters the ECU 1135 uses). The integrated HMI 1130 can represent the hardware and/or software required to provide a graphical interaction mechanism in which the user 1105 can perform functions relating to the configurable operating parameters 1122 of the engine-generator 1115. That is, at least a subset of the HMI 1130 entered values (e.g., a subset related to ECU 1135 functions) for the parameters 1120 can be routed through the ECU 1135.

As used herein, the term "integrated" with respect to the integrated HMI 1130 is used to emphasize that the elements of the HMI 1130 are integrated into the engine-generator 1115. That is, the user 1105 does not need any additional hardware and/or software in order to complete, represent, or perform the functions of the integrated HMI 1130, similar to as described above in connection with the HMI 130 shown in FIG. 1.

For example, the integrated HMI 1130 can include a display screen and keypad encased within the housing of the engine-generator 1115. The components supporting the processing logic and graphical menus of the integrated HMI 1130 can also be accommodated within an appropriate location of the engine-generator's 1115 housing like a designated control area where the sensitive components can be protected from the environmental stresses of operation (e.g., heat and vibration).

In one embodiment, the integrated HMI 1130 is a robust interface and not a "dumb" terminal or control panel. The engine management system (e.g., system 1110) can include configuration management and engine protection diagnostics that runs within the HMI hardware 1130 apart from the display shown to a user. While the engine-generator 1115 may still have a control panel for quick access to functions like power up/off and emergency stop, the integrated HMI 1130 can be configured to be utilized by the user 1105 to calibrate or fine-tune values for the configurable operating parameters 1122 of the engine-generator 1115 in the field (post-installation).

The conventional process for calibrating/tuning an engine-generator 1115 in the field can require a specially-trained or certified technician 105 having a specialized software application running on an electronic device (e.g., laptop or specialized computing device) that would be separate from the engine-generator 1115 prior to calibrating the engine-generator 1115, but then physically connected with the engine-generator 1115 during the calibration, such as by one or more cables. Use of the integrated HMI 1130 can allow the owner/operating entity of the power generation system 1110 overcome key problems with this conventional approach.

First, the integrated HMI 1130 can allow a knowledgeable (and authorized per password or other authentication mechanism) employee 1105 like a ship maintenance engineer (or power engineer in a non-marine application) to make changes to the configurable operating parameters 1122 to calibrate or tune the engine-generator 1115. This can save time and money spent waiting for a third party technician as well as increase the response time in which changes to the configurable operating parameters 1122 can be made, improving the overall effectiveness of the calibration/tuning process. As previously noted, different levels of access can be provided to different types of users. Thus, a ship maintenance engine may be permitted to perform a sub-set of actions via the HMI 1130 that a technician 1105 would be authorized to perform. Regardless, a ship maintenance engineer could solve many routine issues without need of a technician and/or can run initial diagnostics/procedures before a technician arrives to minimize time a technician is required on-vessel.

Secondly, since the HMI 1130 is an integrated component of the engine-generator 1115, this improved process can eliminate dependence upon the specialized auxiliary components associated with the conventional approach. With the conventional approach, should a failure or error occur with the technician's 1105 software application, electronic device, and/or cable connecting the electronic device, the process cannot proceed. While the potential for error cannot be completely eliminated, the integrated HMI 1130 can reduce problems incurred by faulty or mishandled auxiliary components.

Third, a remotely located technician can coach a user 105 to calibrate the parameters 1122 without the user 105 having knowledge of how to do so and without the technician having to travel to the location of the system 1110. As no specialized or separate hardware may be required to calibrate the system 1110 in one embodiment, the technician can remotely coach the user 105 over a telephone connection, video connection, or other communication connection.

Changes made by the user 1105 to a configurable operating parameter 1122 via the integrated HMI 1130 can be stored by the engine management system 1125 in a non-volatile memory 1140 component of the ECU 1135. The ECU 1135 can represent the hardware and/or software components required to electronically monitor and control operation of the components of the engine-generator 1115. ECUs 1135 are well known in the art, and, therefore, will not be described in detail.

In addition to the sensors (not shown) and logic processing components (e.g., processor(s)), ECU 1135 can include a non-volatile memory 1140 component for storing the configurable operating parameters 1122. The type of non-volatile memory 1140 can be capable of read and write operations like a flash memory unit. Non-volatile memory 1140 allowing read/write operations can be required to allow for the storage of changes made to the values of the configurable operating parameters 1122.

Storage of the configurable operating parameters 1122 to non-volatile memory 1140 can be of import should the engine management system 1125 and/or ECU 135 lose communication with the EMS 1125. For example, the non-volatile memory 1140 can be automatically utilized (e.g., storage and latching) when communication loss (problems with ARCNet 1132) occurs between the EMS 1125 and the ECU 1135. The EMS 1125 and ECU 1135 can run in different hardware panels on a vehicle such as a marine vessel.

The master controller (the EMS 1125) can adjust or power-up/down engine-generators 1115 for load balancing, conformance to operational policies, or to handle a detected problem. Thus, the master controller can provide the engine management system 1125 with operating parameters 1120 values to accommodate these situations as they arise.

By capturing the configurable operating parameters 1122 in the non-volatile memory 1140, the modified values can be preserved once the engine-generator 1115 powers down. Further, in the case where the engine-generator 1115 powers up without communication 1132 between the EMS 1125 and ECU 1135, the ECU 1135 can use the stored (in memory 1140) operating parameters 1122 until communication 1132 with the master controller (EMS 1125) is restored.

Storage of the configurable operating parameters 1122 can also support an up/down load functionality to assist in the calibration of multiple engine-generators 1115. Upon selection of the corresponding command by the user 1105, the engine management system 1125 can package the configurable operating parameters 1122 as a configuration file 1165. The configuration file 1165 can be a formatted electronic representation of the configurable operating parameters 1122 that the engine management system 1125 can read and write.

A data storage device 1160 can then be connected to the engine management system 1125 via the I/O module 1145. The I/O module 1145 can represent the hardware and/or software components required to support communication with external devices like data storage device 1160. The I/O module 1145 can include one or more ports that support connection to the external device directly or through the use of an appropriate data cable.

The data storage device 1160 can be an electronic device capable of connecting to the I/O module 1145 and storing the configuration file 1165. For example, a portable flash memory device 1160 (e.g., thumb drive or memory stick) can be directly connected to the I/O module 1145. As another example, the data storage device 1160 can be represented by a laptop computer connected to the I/O module 1145 using a USB data cable. Other communication protocols and standards (e.g., ESATA, FIREWIRE, BLUETOOTH, WIFI, etc.) can be used for enabling communications between I/O module 1145 and device 1160.

The data storage device 1160 can then be connected to other engine-generators 1115 predetermined as identical or comparable to the engine-generator 1115 that created the configuration file 1165. The configuration file 1165 can be uploaded by the engine management system 1125 of the other engine-generators 1115 to provide quick and uniform calibration between different engine-generators 1115.

View 1180 shows a non-limiting implementation example in the context of a vehicle propulsion system, such as a marine propulsion system. The view 1180 shows how the HMI 1130 can be integrated in an accessible and compact space near the ECU 1135 in one contemplated embodiment. A panel closed view 1182 shows a HMI 1130 with a set of actuators 1184 (buttons, switches, dials, etc.), which can be adjusted by a user. More than one HMI 1130 can be implemented in the vehicle, such as a marine vessel. For example, one HMI 1130 can be located proximate to the ECU 1135 (as shown) and another different HMI 1130 can be located in the vessel's bridge. When the panel is opened (view 1190), various connections can be seen, such as the ECU 1135.

Figure 6:
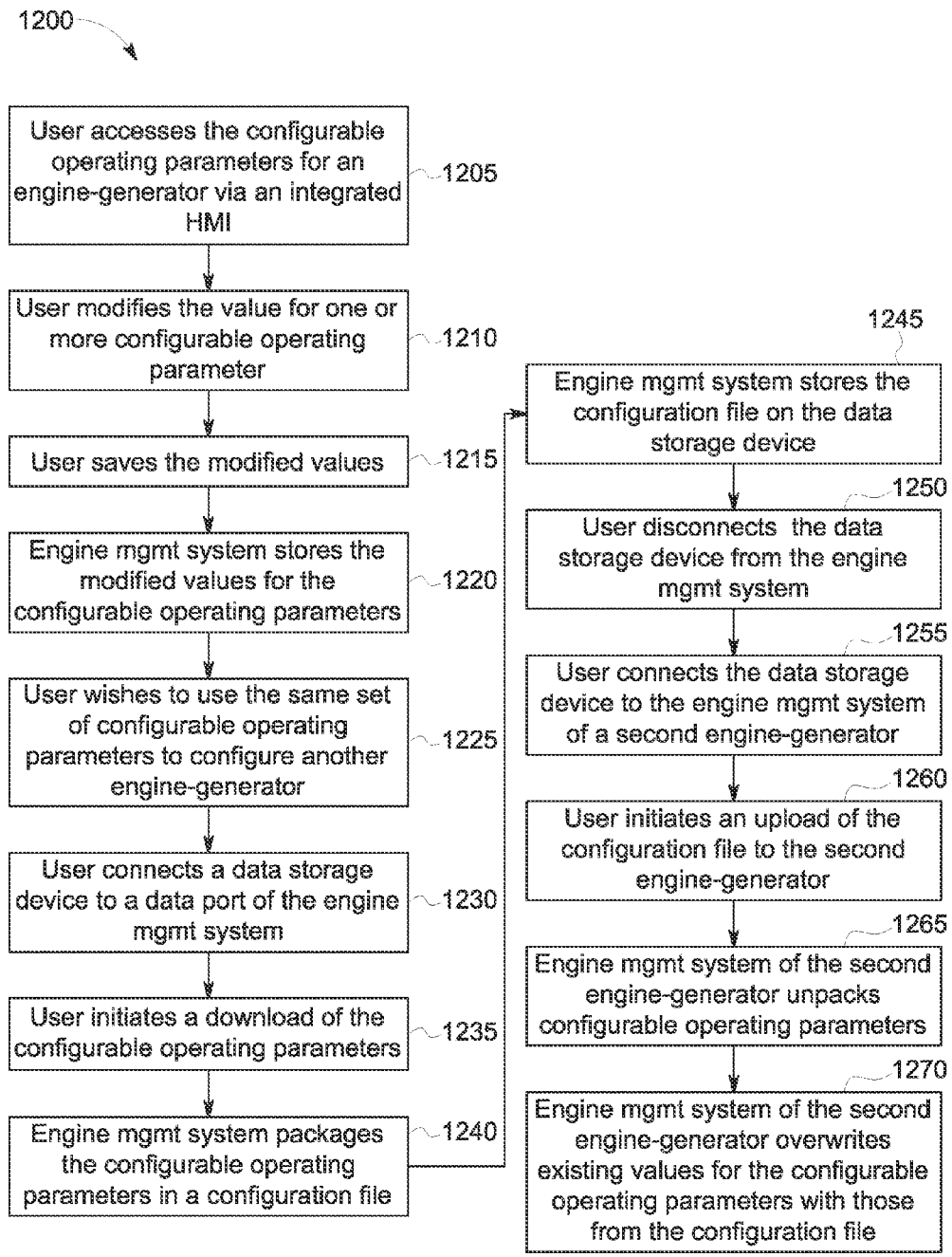
FIG. 6 is a flow chart of a method detailing the calibration of multiple engine-generators using an integrated human-machine interface (HMI), according to an embodiment of the invention.

FIG. 6 is a flow chart of a method 1200 for calibrating multiple engine-generators using an integrated human-machine interface (HMI) in accordance with embodiments of the invention. Method 1200 can be performed within the context of system 1100.

At 1205, a user can access the configurable operating parameters for an engine-generator via an integrated HMI. At 1210, the user can modify the value of one or more configurable operating parameters. At 1215, the modified values of the configurable operating parameters can be saved by the user.

At 1220, the engine management system can store the modified values for the configurable operating parameters. The modified values can be stored to a local volatile memory store (e.g., a working cache), as well as to the non-volatile memory component of the ECU. At 1225, the user can desire to use the same set of configurable operating parameters to configure another engine-generator.

At 1230, the user can then connect a data storage device to a data port of the engine management system. At 1235, the user can initiate a download of the configurable operating parameters. At 1240, the engine management system can package the configurable operating parameters in a configuration file.

At 1245, the engine management system can store the configuration file to the data storage device. At 1250, the user can disconnect the data storage device from the engine management system. At 1255, the user can connect the data storage device to the engine management system of a second engine-generator.

At 1260, the user can initiate an upload of the configuration file to the second engine-generator. At 1265, the engine management system of the second engine-generator can unpack the configurable operating parameters from the configuration file. At 1270, the engine management system of the second engine-generator can then overwrite any existing values for the configurable operating parameters with those unpacked from the configuration file.

Figure 7:
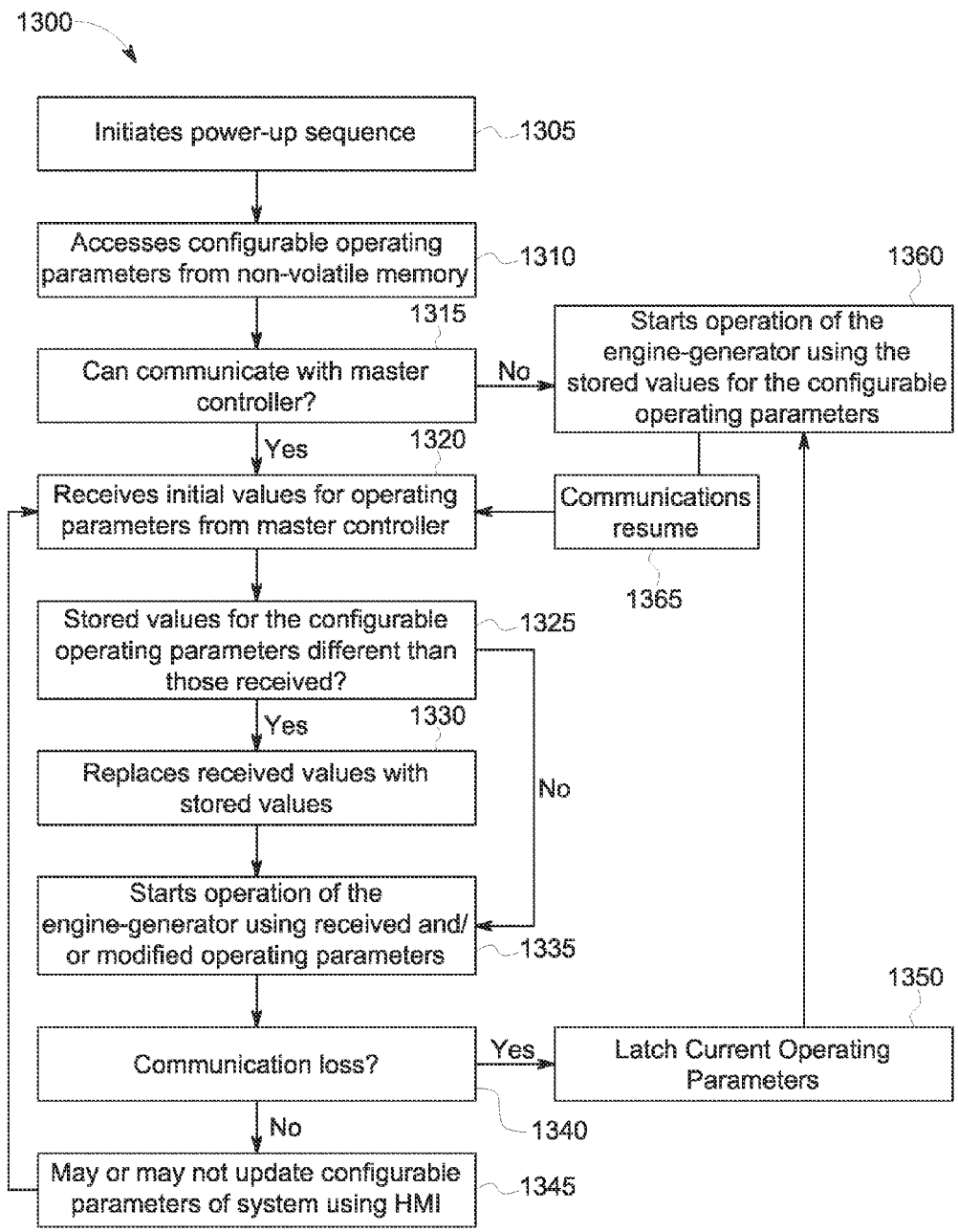
FIG. 7 is a flow chart of a method describing the engine control unit (ECU) in operation, according to an embodiment of the invention.

FIG. 7 is a flow chart of a method 1300 describing the engine control unit (ECU) in operation in accordance with embodiments of the invention. Method 1300 can be performed within the context of system 1100.

At 1305, an engine controller powers up. At 1310, the ECU can read the non-volatile memory (e.g., the memory 1140) to obtain operating parameters. These values can represent initial values for the ECU. In the case of a first time power-up, the values from the non-volatile memory can be a set of default values.

At 1315, a check can be performed to see if communications (e.g., ARCNet) exist between the master controller (e.g., EMS system) and the ECU. If not, the method can progress from 1315 to 1360, as shown. When communications exist, at 1320, values are received from the master controller (e.g., EMS).

At 1325, the received values can be compared to the values obtained from the nonvolatile memory. At 1330, if the ECU non-volatile memory values differ from those of the master controller, then the non-volatile memory value can be replaced with the values received from the EMS. Operating parameters used by the ECU can also be replaced by received values. At 1335, the engine can operate using the operating parameters established by the ECU.

A determination is made at 1340 as to whether a communication loss occurs between the EMS and the ECU. If not, at 1345, a user may or may not update configurable parameters of the system using the HMI. When updates are received, these can be conveyed from the EMS to the ECU and utilized, as shown by the method progressing from 1345 to 1320.

If a communication loss between the master controller and the ECU is detected at 1340, current operating parameters can be latched (or retained/used by the ECU during this communication outage) at 1350. At 1360, the engine can continue to operate using these latched parameters (which can also be stored to the non-volatile memory of the ECU). At 1365, values from the EMS can be received by the ECU and adjustments can be made when communications resume, as shown by the method progressing from 1365 to 1320.

In one embodiment, a method (e.g., for controlling operations of one or more engine-generators) includes modifying one or more values of a first set of plural configurable operating parameters for a first engine-generator. The first engine-generator includes an integrated human-machine interface (HMI) and a first engine management system. The configurable operating parameters are utilized by the first engine management system to control operations of the first engine-generator. The one or more values of the first set are modified based on user operation of the HMI. The method also includes locally saving the one or more values of the first set of the configurable engine parameters that are modified. The one or more values that are modified are saved to a memory that is local to the first engine-generator. The method further includes transferring the first set of configurable operating parameters, including the one or more values of the configurable operating parameters that are modified, from the first engine-generator to a separate and distinct second engine-generator and replacing one or more values of a second set of plural configurable operating parameters associated with the second engine-generator with the one or more values of the first set of configurable operating parameters that are modified. The second engine-generator operates using the one or more values of the second set of configurable operating parameters that are obtained from the first engine-generator.

In another aspect, replacing the one or more values of the second set of configurable operating parameters includes modifying the second set of configurable operating parameters in a memory of a second engine management system that uses the second set of configurable operating parameters to control operations of the second engine-generator.

In another aspect, transferring the first set of configurable operating parameters includes generating a configuration file comprising the first set of configurable engine parameters using the first engine management system and loading the configuration file onto a memory associated with a second engine management system that controls operations of the second engine-generator.

In another aspect, the first and second engine-generators are at least one of a common type or model of engine-generators.

In another aspect, modifying the one or more values of the first set of configurable engine parameters includes presenting the first set of configurable operating parameters within the HMI of the first engine-generator and receiving at least one input command via the HMI that represents a modification to the one or more values of the first set of configurable operating parameters.

In another aspect, locally saving the one or more values of the first set of configurable operating parameters includes storing the one or more values of the first set of configurable operating parameters that are modified in a non-volatile memory location of the first engine management system.

In another aspect, transferring the first set of configurable operating parameters includes connecting a removable data storage device to the first engine management system of the first engine-generator, saving the first set of configurable operating parameters to the removable data storage device, disconnecting the removable data storage device from the first engine management system of the first engine-generator, connecting the removable data storage device to a second engine management system that controls operations of the second engine-generator, and transferring at least one of the configurable operating parameters, including at least one of the values that are modified, from the removable data storage device to a memory location of the second engine management system of the second engine-generator.

In another aspect, the first set of configurable operating parameters is stored in the first engine management system. The method can further include detecting an inability of the first engine-generator to communicate with a master controller of the first engine management system and accessing the first set of configurable operating parameters of the first engine management system. The configurable engine parameters are stored outside of the first engine management system during a previous operation cycle of the first engine-generator. The method also can include utilizing the first set of configurable operating parameters of the first engine management system to manage operation of the first engine-generator until the first engine management system re-establishes communication with the master controller or until the first engine-generator transitions to a power-down state.

In one embodiment, a system (e.g., a power generation system) includes a first engine-generator having an engine, a generator coupled to the engine, at least one storage medium, an integrated human-machine interface (HMI), and an engine management system. Operation of the engine runs the generator for generating electricity. The at least one storage medium is configured to store at least a first subset of plural operating parameters that are used to control operations of the first engine-generator. One or more of the operating parameters of the first subset are configurable. The HMI is integrated in the first engine-generator and is configured to receive input from an operator to modify the one or more configurable operating parameters of the first subset. The engine management system is configured to control operations of the first engine-generator based upon the one or more configurable operating parameters that are modified using the HMI.

In another aspect, the system also includes a master controller that is configured to communicate with the first engine-generator and to manage performance of the first engine-generator and a second engine-generator of a power generation system. The master controller is configured to provide values for the plural operating parameters that are used to control operations of the first and second engine-generators. The engine management system is configured to control operations of the first engine-generator based upon the one or more configurable operating parameters that are modified using the HMI and upon and the operating parameters that are provided by the master controller.

In another aspect, the HMI is configured to download the one or more configurable operating parameters to a moveable storage device in order to transfer the one or more configurable operating parameters to the second engine-generator of the power generation system, the first and second engine-generators being separate and distinct from each other.

In another aspect, the engine management system further comprises an engine control unit (ECU) configured to control operations of an engine of the first engine-generator.

In another aspect, the ECU further comprises a non-volatile memory component configured to store the one or more configurable operating parameters of the first subset when a loss of communication between the engine management system and the master controller occurs.

In one embodiment, a method (e.g., for controlling operations of an engine-generator) includes detecting of an inability of an engine management system to communicate with a master controller. The engine management system is configured to control operations of an engine-generator. The master controller is configured to provide values of a first set of operating parameters of the engine-generator that are used to control the operations of the engine-generator by the engine management system. The method also includes determining an operating state of the engine-generator as being at least one of a power-up state, an in-operation state, or a power-down state and accessing one or more configurable operating parameters of the first set of operating parameters from a non-volatile memory store of the engine management system when the operating state of the engine-generator is the power-up state. The one or more configurable operating parameters were previously stored in the non-volatile memory store during a previous operation cycle of the engine-generator. The method further includes utilizing the one or more configurable operating parameters by the engine management system to control the operations of the engine-generator when the engine-generator transitions to the in-operation state. Utilization of the one or more configurable operating parameters continues until communication between the engine management system and the master controller is re-established.

In another aspect, utilization of the one or more configurable operating parameters by the engine management system continues until the engine-generator transitions to the power-down state.

In another aspect, the method also includes storing current values of the one or more configurable operating parameters in the non-volatile memory store when the operating state of the engine-generator is the in-operation state or the power-down state.

In another aspect, utilizing the one or more configurable operating parameters by the engine management system to control the operations of the engine-generator when the engine-generator transitions to the in-operation state continues until the engine-generator transitions to the power-down state.

In one embodiment, a method (e.g., for managing an engine control unit) includes managing a first engine control unit (ECU) with an engine management system (EMS) having an integrated human machine interface (HMI) through which operating parameters of a first engine-generator are able to be modified. The EMS is configured to be communicatively linked over a communication network with the first ECU. The first ECU controls operations of the first engine-generator using the operating parameters.

In another aspect, the method also includes receiving user input from a user of the HMI in order to modify at least one of the operating parameters that are used to control the operations of the first engine-generator.

In another aspect, the method also includes determining if the user input is received from an authorized user. The at least one of the operating parameters that are used to control the operations of the first engine-generator are only modified if it is determined that the user input is received from the authorized user.

In another aspect, the method also includes conveying at least one message based on the user input over the communication network between the EMS and the first ECU and changing the at least one of the operating parameters used by the first ECU in accordance with the user input from the HMI. Changes of the at least one of the operating parameters that are based on the user input received via the HMI are maintained over a power-cycle of the EMS and are maintained even when communications over the communication network linking the EMS to the first ECU is disrupted.

In another aspect, the first ECU is a standalone system configured to operate independent of the EMS.

In another aspect, the method also includes saving the at least one of the operating parameters that is changed in accordance with the user input received from the HMI in a non-volatile data store of the first ECU.

In another aspect, the method also includes transferring the operating parameters of the first ECU from the first ECU to a data storage device located external to the first ECU via the HMI.

In another aspect, the method also includes transferring the operating parameters from the data storage device to a second engine control unit (ECU) for use by the second ECU in controlling operations of a second engine-generator that is separate and distinct from the first engine-generator.

In one embodiment, a system (e.g., a power generation system) includes an engine management system (EMS), an engine control unit (ECU), and a non-volatile memory device. The EMS has an integrated human machine interface (HMI) that is configured to receive input from users to modify one or more operating parameters of a plurality of engine generators of a power generation system. The ECU is configured to control operations of the plurality of engine-generators based on the operating parameters, including the one or more operating parameters that are to be modified based on the input from the users. The ECU and EMS are configured to be communicatively linked by a communication network in order to communicate the operating parameters. The non-volatile memory device is configured to store the one or more operating parameters that are modified. Changes to the one or more operating parameters that are input via the HMI are maintained on the memory device over a power-cycle of the EMS and when communications over the communication network linking the EMS to the ECU are disrupted.

In another aspect, the plurality of engine-generators control propulsion of a marine vessel.

In another aspect, the HMI is a standards-based interface that is configured to receive the input to modify the one or more operating parameters of the engine control unit and to receive input to modify different, additional operating parameters associated with different, additional engine control units.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be standalone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

The invention claimed is:

1. A system comprising:
a first engine-generator comprising:
an engine;
a generator coupled to the engine, wherein operation of the engine runs the generator for generating electricity;
at least one non-transitory storage medium configured to store at least a first subset of plural operating parameters that are used to control operations of the first engine-generator, wherein one or more of the operating parameters of the first subset are configurable and wherein at least one of the operating parameters is received by the at least one non-transitory storage medium from a removable data storage device via one or more ports of the first engine-generator;
an integrated human-machine interface (HMI) integrated in the first engine-generator, the HMI configured to receive input from an operator to modify the one or more operating parameters of the first subset that are configurable; and
an engine management system configured to control operations of the first engine-generator based upon the one or more operating parameters that are configurable and that are modified using the HMI.

2. The system of claim 1, further comprising:
a master controller configured to communicate with the first engine-generator and to manage performance of the first engine-generator and a second engine-generator of a power generation system, the master controller configured to provide values for at least one operating parameter of the plural operating parameters that are used to control operations of the first and second engine-generators;
wherein the engine management system is configured to control operations of the first engine-generator based upon the one or more operating parameters that are configurable and that are modified using the HMI and upon and the at least one operating parameter that is provided by the master controller.

3. The system of claim 2, wherein the HMI is configured to download the one or more operating parameters that are configurable to the removable data storage device or another data storage device via the one or more ports of the first engine-generator.

4. The system of claim 1, wherein the engine management system further comprises an engine control unit (ECU) configured to control operations of an engine of the first engine-generator.

5. The system of claim 4, wherein the ECU further comprises a non-volatile memory component configured to store the one or more operating parameters of the first subset that are configurable responsive to a loss of communication between the engine management system and the master controller.

6. The system of claim 1, wherein the HMI is configured to receive at least one of the operating parameters from a different, second engine-generator via the removable data storage device.

7. The system of claim 1, wherein the HMI is configured to receive the input from the operator to modify the one or more operating parameters of the first subset that are configurable for the first engine-generator, the HMI also configured to receive other input from the operator to modify one or more operating parameters that are configurable for a separate, second engine-generator.

8. The system of claim 7, wherein the HMI is a standards-based interface.

9. The system of claim 1, wherein the at least one non-transitory storage medium is configured to store the one or more operating parameters that are modified, wherein changes to the one or more operating parameters that are received via the HMI are maintained on the at least one non-transitory storage medium over a power-cycle of the energy management system.

10. The system of claim 1, wherein the at least one non-transitory storage medium is configured to store the one or more operating parameters that are modified, wherein changes to the one or more operating parameters that are received via the HMI are maintained on the at least one non-transitory storage medium through a disruption of communications over a communication network linking the engine management system to an external engine control unit.

11. The system of claim 1, wherein the engine management system is configured to control an air-to-fuel ratio of the engine based on at least one of the operating parameters that is modified by the operator.

12. The system of claim 1, wherein the engine management system is configured to control how much fuel is provided to one or more cylinders of the engine based on at least one of the operating parameters that is modified by the operator.

13. The system of claim 1, wherein the engine management system is configured to control one or more of an acceleration limit or a deceleration limit of the engine based on at least one of the operating parameters that is modified by the operator.

14. A system comprising:
an engine management system (EMS) with an integrated human machine interface (HMI), wherein the HMI is configured to receive input from users to modify one or more operating parameters of a plurality of engine generators of a power generation system;
an engine control unit (ECU) configured to control operations of the plurality of engine-generators based on the operating parameters, including the one or more operating parameters that are to be modified based on the input from the users, the ECU and EMS configured to be communicatively linked by a communication network in order to communicate the operating parameters; and
a non-volatile memory device configured to store the one or more operating parameters that are modified, wherein changes to the one or more operating parameters that are input via the HMI are maintained on the memory device over a power-cycle of the EMS and when communications over the communication network linking the EMS to the ECU are disrupted.

15. The system of claim 14, wherein the plurality of engine-generators controls propulsion of a marine vessel.

16. The system of claim 14, wherein the HMI is a standards-based interface that is configured to receive the input to modify the one or more operating parameters of the engine control unit and to receive input to modify different, additional operating parameters associated with different, additional engine control units.

17. The system of claim 14, wherein the EMS is configured to control an air-to-fuel ratio of at least one of the engine generators based on at least one of the operating parameters that is modified.

18. The system of claim 14, wherein the EMS is configured to control how much fuel is provided to one or more cylinders of at least one of the engine generators based on at least one of the operating parameters that is modified.

19. The system of claim 14, wherein the EMS is configured to control one or more of an acceleration limit or a deceleration limit of at least one of the engine generators based on at least one of the operating parameters that is modified.

* * * * *